United States Patent
Sui et al.

(10) Patent No.: US 7,630,221 B2
(45) Date of Patent: Dec. 8, 2009

(54) BRIDGELESS PFC CIRCUIT FOR CRM AND CONTROLLING METHOD THEREOF

(75) Inventors: Lubo Sui, Shnghai (CN); Hongyuan Jin, Shanghai (CN); Hongjian Gan, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 12/401,983

(22) Filed: Mar. 11, 2009

(65) Prior Publication Data
US 2009/0230929 A1   Sep. 17, 2009

(30) Foreign Application Priority Data
Mar. 11, 2008   (TW)   ............... 97108587 A

(51) Int. Cl.
*H02M 7/08*   (2006.01)
*G05F 1/70*   (2006.01)

(52) U.S. Cl. ........................ 363/70; 323/207

(58) Field of Classification Search ................. 323/224, 323/222, 207, 272; 363/70
See application file for complete search history.

(56) References Cited

U.S. PATENT DOCUMENTS

| | | | | |
|---|---|---|---|---|
| 7,116,087 B2 * | 10/2006 | Zhang et al. | ................ | 323/272 |
| 7,183,754 B2 * | 2/2007 | Tsuruya | ..................... | 323/272 |
| 7,276,884 B2 * | 10/2007 | Tsuruya | ..................... | 323/261 |
| 7,279,868 B2 * | 10/2007 | Lanni | ......................... | 323/222 |

* cited by examiner

*Primary Examiner*—Shawn Riley
(74) *Attorney, Agent, or Firm*—Volpe and Koenig, PC

(57) ABSTRACT

The configurations of a bridgeless PFC circuit system and a controlling method thereof are provided. The proposed system includes a bridgeless PFC circuit having a first and a second input terminals, a first switch having a first terminal, a first inductor having a first terminal coupled to the first input terminal and a second terminal coupled to the first terminal of the first switch, and a second inductor having a first terminal coupled to the second input terminal, a first auxiliary winding coupled to the first inductor and generating a first sensing signal, and a second auxiliary winding coupled to the second inductor and generating a second sensing signal, wherein the first and the second sensing signals are used to generate an inductor current sensing signal controlling the switching of the first switch accordingly.

18 Claims, 14 Drawing Sheets

US 7,630,221 B2

BRIDGELESS PFC CIRCUIT FOR CRM AND CONTROLLING METHOD THEREOF

FIELD OF THE INVENTION

The present invention relates to a bridgeless power factor correction (PFC) circuit for a CRM (critical conduction mode) and a controlling method thereof, which can be employed to solve the controlling problem of the CRM of the PFC circuit.

BACKGROUND OF THE INVENTION

In the conventional boost PFC circuits, the rectifying bridge loss becomes one of the main losses of the switching mode power supply. Following the requirements regarding the convention efficiency are improved, the bridgeless boost topology deriving from the conventional boost PFC circuit has gradually become the focus of the R&D. The bridgeless boost topology omits the rectifying bridge in the front stage of the boost PFC circuit, decreases the loss of a diode, and increases the efficiency. And a dual boost PFC (DBPFC) circuit belongs to a kind of bridgeless boost topologies (please refer to FIG. 1). In FIG. 1, the bridgeless PFC circuit receives the input voltage Vin, generates the output voltage Vo, and includes diodes D1-D4, switches S1-S2, inductors L1-L2 and an output capacitor Co.

In the applications for the medium and small power occasions, the conventional boost PFC topology is widely applied due to its simple configuration, better stability and smaller switch stress. In the CRM, the inductor current has to be decreased to zero before the next period begins. Since the MOSFET can not be turned on before the inductor current reaching zero and there is no reverse recovery loss of the boost rectifying diode, the efficiency in this mode is higher. Besides, since there is no dead time between periods, the current of AC circuit is continuous, and a triangle wave is flowing through the winding. The PFC circuit will adjust the amplitudes of these triangle waves to make the winding current be a sinusoidal wave (after rectifying) in average (please refer to FIG. 2, and the meanings of the regions of the triangle wave, and the names of the waveforms and the traverse axle are shown therein).

In the conventional boost PFC circuit, a method of measuring the voltage of the auxiliary winding of the boost inductor is usually employed to judge the zero-crossing time of the inductor current so as to realize the CRM controlling. The polarity of the auxiliary winding of the inductor is reversed to the polarity of the inductor. The voltage of the auxiliary winding is negative and is proportional to the amplitude of rectified AC voltage when the MOSFET is turned on. The sensed voltage of the auxiliary winding is positive and is proportional to a difference between the output voltage and the rectified AC voltage amplitude when the MOSFET is turned off. The parasitic capacitance at the output terminal of the MOSFET (the parasitic capacitance between drain terminal and source terminal of MOSFET) is resonant with the boost inductor when the inductor current reaches zero. The voltage of the auxiliary winding is decreased due to the resonance. A signal for turning on the MOSFET is sending out when the voltage of the auxiliary winding is lower than a threshold voltage set up by the IC so as to realize the CRM controlling. This kind of method is employed by many ICs, e.g., L6561, FAN7528, NCP1606, UCC38050etc. (please refer to FIG. 3). FIG. 3 is a schematic circuit diagram of a conventional boost PFC circuit realizing the CRM controlling through measuring the voltage of the auxiliary winding of the boost inductor. In FIG. 3, the PFC circuit receives an input voltage Vin and generates an output voltage Vo, and includes diodes D1-D6, resistors R1-R6 and $R_{ZCD}$, switch S1, IC FAN7529 (having terminals $V_{CC}$, MOT, COMP, GND, CS, INV, and ZCD), inductor L1 and auxiliary winding NAUX and capacitors C1-C2 and Co, wherein GND is the grounding terminal.

FIGS. 4(a)-4(b) are schematic circuit diagrams showing the statuses of the positive half-cycle and the negative half-cycle of a period of frequency of the conventional dual boost PFC circuit respectively. The elements included in FIGS. 4(a)-4(b) are the same as those of FIG. 1, wherein the driving signals of the switches S1 and S2 have the same phase. L1, D3, D1, S1 and C1 form a boost circuit when the input voltage is in its positive half-cycle. The current flows through L1 and S1 when S1 turns on, and there are two returning paths, one is returning via D1 and the other is returning via S2 and L2. The current flows through L1, D3 and C1 when S1 turns off, and the returning paths are the same as above-mentioned, one is returning via D1 and the other is returning via the body diode of S2 and L2. L2, D4, S2, D2 and C1 form another boost circuit when the input voltage is in its negative half-cycle. The current flows through L2 and S2 when S2 turns on, and one of the returning paths is returning via D2 and the other is returning via S1 and L1. The current flows through L2, D4 and C1 when S2 turns off, and one of the returning paths is returning via D2 and the other is returning via the body diode of S1 and L1. Due to that D1 and D2 clamp the AC power source to the negative output terminal of the boost circuit, a common mode noise, which is the same as the conventional boost PFC circuit, could be obtained. Since the current flows through only two elements during a switch period, the conduction loss is decreased.

FIG. 5 is a schematic circuit diagram of a conventional dual boost PFC circuit realizing the CRM controlling via employing a current transformer (CT). Except for a portion which is the same as that of FIG. 1, it further includes an RS flip-flop, a comparator, an error amplifier (EA) and three CTs CT1-CT3. Since the dual boost PFC circuit has three current sub-circuits during the positive and negative half-cycles of the input voltage, the three corresponding CTs CT1-CT3 must be used to sample the inductor current so as to turn on the MOSFET for realizing the CRM controlling. The turn-off time period of MOSFET is determined by the ramp signal and the output signal Vcomp of the error amplifier EA.

FIG. 6 is the waveform diagram of the controlling signals of the circuit as shown in FIG. 5, which includes the inductor current (signal), CT signal, the ramp signal, Q1 driving (signal) and Q2 driving (signal). Because the inductor current signal is sampled through the CT, its amplitude is varied according to the high/low of the input AC voltage and the light/heavy of the output load. The inductor current signal is easy to be interfered by the noise when the amplitude of inductor current is quite small such that the turn-on of the MOSFET produces error implementation and the zero-current switching (ZCS) condition is lost. When the input voltage is quite high, the descending slope of the inductor current is decreased slowly. Due to that the measuring threshold value is quite small, MOSFET is turned on before the inductor current decreases to zero, which will increase the turn-on loss.

FIG. 7 is a waveform diagram showing a failure of measuring the inductor current reaching zero under high input voltage and full-load condition (264Vin and 310 W load) of the circuit as shown in FIG. 5.

Keeping the drawbacks of the prior arts in mind, and employing experiments and research full-heartily and persistently, the applicant finally conceived a bridgeless power factor correction circuit for a CRM and a controlling method thereof.

SUMMARY OF THE INVENTION

It is therefore an object of the present invention to provide a method measuring a combined voltage of two inductor auxiliary windings to realize the measurement of the zero-crossing current of the inductor so as to control the DBPFC to work under the CRM. The controlling method does not need to measure the inductor current, does not need to measure the AC input voltage, could obtain the signal of the zero-crossing current of the inductor current irrelevant to the AC input voltage and the output load, and which causes the MOSFET turn on accurately, and the switching on loss to be decreased. The efficiency is higher.

According to the first aspect of the present invention, a bridgeless power factor correction (PFC) circuit system includes a bridgeless PFC circuit having a first and a second input terminals, a first and a second output terminals, a first switch having a first terminal and a second terminal coupled to the second output terminal, a first inductor having a first terminal coupled to the first input terminal and a second terminal coupled to the first terminal of the first switch, and a second inductor having a first terminal coupled to the second input terminal, and a sensing circuit including a first auxiliary winding magnetically coupled to the first inductor and generating a first sensing signal, a second auxiliary winding magnetically coupled to the second inductor and generating a second sensing signal, wherein the first and the second sensing signals are used to generate an inductor current sensing signal and the first switch is turned on when a value of the inductor current sensing signal is a predetermined value.

Preferably, the bridgeless PFC circuit further includes a first diode having an anode coupled to the second terminal of the first switch and a cathode coupled to the first terminal of the second inductor, and a second diode having an anode coupled to the second terminal of the first switch and a cathode coupled to the first terminal of the first inductor, the sensing circuit is an inductor current sensing circuit, the first and the second auxiliary windings have two first terminals generating the first and the second sensing signals respectively and two second terminals, each the second terminal has one of a function of receiving a predetermined voltage value and a function of grounding, a first polarity of the first auxiliary winding is reverse to a first polarity of the first inductor, a first polarity of the second auxiliary winding is reverse to a first polarity of the second inductor, and the inductor current sensing circuit further includes a first resistor having a first terminal coupled to the first terminal of the second auxiliary winding and a second terminal, a second resistor having a first terminal coupled to the first terminal of the first auxiliary winding and a second terminal coupled to the second terminal of the first resistor, and a capacitor having a first terminal coupled to the second terminal of the second resistor and outputting the inductor current sensing signal, and a second terminal grounded.

Preferably, the bridgeless PFC circuit is a dual boost PFC circuit, the dual boost PFC circuit further includes a second switch, the second switch is turned on when a value of the inductor current sensing signal is a predetermined value, and the first and the second resistors have the same resistance.

Preferably, the system further includes a control circuit, wherein the second inductor further includes a second terminal, the bridgeless PFC circuit is a dual boost PFC circuit including a second switch having a first and a second terminals and a first and a second diodes, each of the first and the second diodes has an anode and a cathode, the anode of the first diode is coupled to the second terminal of the first inductor, the cathode of the first diode is coupled to the first output terminal, the anode of the second diode is coupled to the second terminal of the second inductor and the first terminal of the second switch, the cathode of the second diode is coupled to the first output terminal, the second terminals of the first and the second switches are coupled to the second output terminal, and the control circuit includes an error amplifier receiving a reference voltage and an output voltage feedback signal generated by the dual boost PFC circuit, and generating a first output signal, a comparator receiving the first output signal and an external ramp signal, and generating a second output signal, and a flip-flop having a first input terminal receiving the inductor current sensing signal, a second input terminal receiving the second output signal and an output terminal generating a driving signal driving the first and the second switches.

Preferably, the flip-flop is an RS flip-flop.

According to the second aspect of the present invention, a bridgeless power factor correction (PFC) circuit system includes a bridgeless PFC circuit having a first and a second input terminals, a first switch having a first terminal, a first inductor having a first terminal coupled to the first input terminal and a second terminal coupled to the first terminal of the first switch, and a second inductor having a first terminal coupled to the second input terminal, a first auxiliary winding coupled to the first inductor and generating a first sensing signal, and a second auxiliary winding coupled to the second inductor and generating a second sensing signal, wherein the first and the second sensing signals are used to generate an inductor current sensing signal and the first switch is turned on when a value of the inductor current sensing signal is a predetermined value.

Preferably, the first switch further includes a second terminal, the bridgeless PFC circuit further includes a first diode having an anode coupled to the second terminal of the first switch and a cathode coupled to the first terminal of the second inductor, and a second diode having an anode coupled to the second terminal of the first switch and a cathode coupled to the first terminal of the first inductor, the first auxiliary winding has a first polarity reversed to a first polarity of the first inductor, the second auxiliary winding has a first polarity reversed to a first polarity of the second inductor, the first and the second auxiliary windings respectively have two first terminals outputting the first and the second sensing signals respectively and two second terminals, each the second terminal has one of a function of receiving a predetermined voltage value and a function of grounding, and the system further includes a first resistor having a first terminal coupled to the first terminal of the second auxiliary winding and a second terminal, a second resistor having a first terminal coupled to the first terminal of the first auxiliary winding and a second terminal coupled to the second terminal of the first resistor, and a capacitor having a first terminal coupled to the second terminal of the second resistor and outputting the inductor current sensing signal, and a second terminal grounded.

Preferably, the first and the second resistors have the same resistance.

Preferably, the system further includes a control circuit, wherein the second inductor further includes a second terminal, the bridgeless PFC circuit is a dual boost PFC circuit including a first and a second output terminals, a second switch having a first and a second terminals, and a third and a fourth diodes, each of the third and the fourth diodes has an anode and a cathode, the anode of the third diode is coupled to the second terminal of the first inductor, the cathode of the third diode is coupled to the first output terminal, the anode of the fourth diode is coupled to the second terminal of the second inductor and the first terminal of the second switch, the cathode of the fourth diode is coupled to the first output terminal, the second terminals of the first and the second switches are coupled to the second output terminal, and the control circuit includes an error amplifier receiving a reference voltage and an output voltage feedback signal generated by the dual boost PFC circuit, and generating a first output signal, a comparator receiving the first output signal and an external ramp signal, and generating a second output signal, and a flip-flop having a first input terminal receiving the inductor current sensing signal, a second input terminal receiving the second output signal and an output terminal generating a driving signal to drive the first and the second switches.

According to the third aspect of the present invention, a controlling method for a bridgeless PFC circuit system, wherein the system includes a bridgeless PFC circuit having a first switch, a first and a second inductors, a first auxiliary winding coupled to the first inductor and a second auxiliary winding coupled to the second inductor, includes steps of: causing the first auxiliary winding to generate a first sensing signal; causing the second auxiliary winding to generate a second sensing signal; using the first sensing signal and the second sensing signal to generate an inductor current sensing signal; and turning on the first switch when a value of the inductor current sensing signal is a predetermined value.

Preferably, the first auxiliary winding has a first polarity reversed to a first polarity of the first inductor, and the second auxiliary winding has a first polarity reversed to a first polarity of the second inductor.

Preferably, the bridgeless PFC circuit is a dual boost PFC circuit.

Preferably, the method further includes a step of: turning on the second switch when a value of the inductor current sensing signal is a predetermined value.

Preferably, the method further includes a step of: generating a driving signal to drive the first and the second switches.

According to the fourth aspect of the present invention, a bridgeless PFC circuit system includes a bridgeless PFC circuit having a first and a second output terminals, a first and a second power input terminals, a first and a second inductors, two switch bridges, an output capacitor, wherein the two switch bridges and the output capacitor are connected between the first and the second output terminals, each the switch bridge includes two series connected switches having a middle point, one of the two series connected switches is a controllable switch connected to the second output terminal, and each the middle point connected to the respective first and second power input terminals via the first and the second inductors, two clamping switches connected to the second output terminal and the first and the second power input terminals, a first auxiliary winding coupled to the first inductor and generating a first sensing signal, and a second auxiliary winding coupled to the second inductor and generating a second sensing signal, and a signal processing circuit processing the first and the second sensing signals and generating a control signal to control each the controllable switch.

Preferably, the two clamping switches are two diodes.

Preferably, the control signal is a zero-crossing current signal generated via accumulating the first and the second sensing signals to control each the controllable switch accordingly.

The present invention may best be understood through the following descriptions with reference to the accompanying drawings, in which:

DETAILED DESCRIPTION OF THE PREFERRED EMBODIMENT

Figure 1:
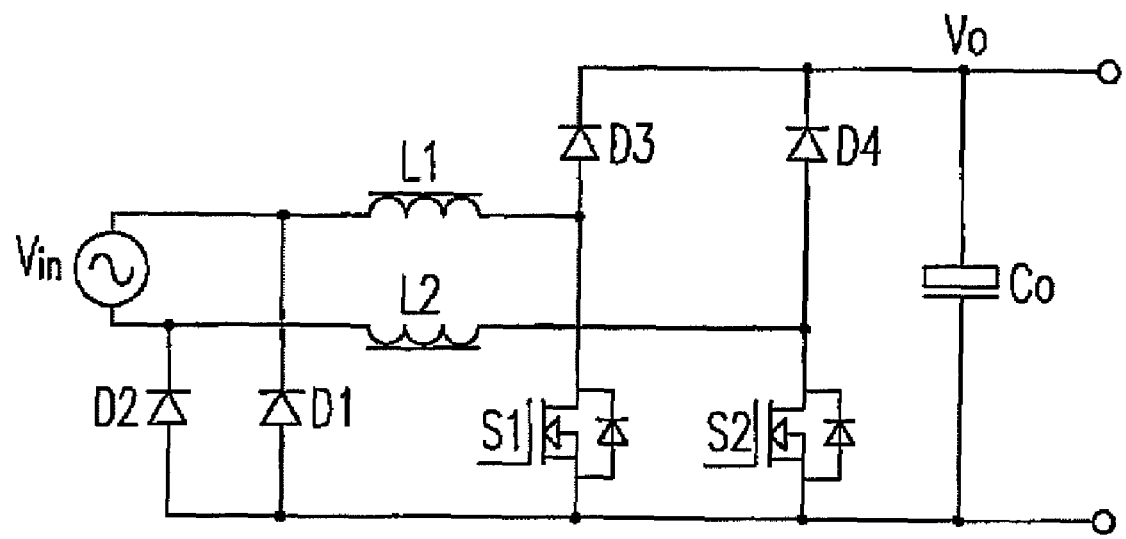
FIG. 1 shows a circuit diagram of a dual boost PFC circuit in the prior art.
Figure 2:
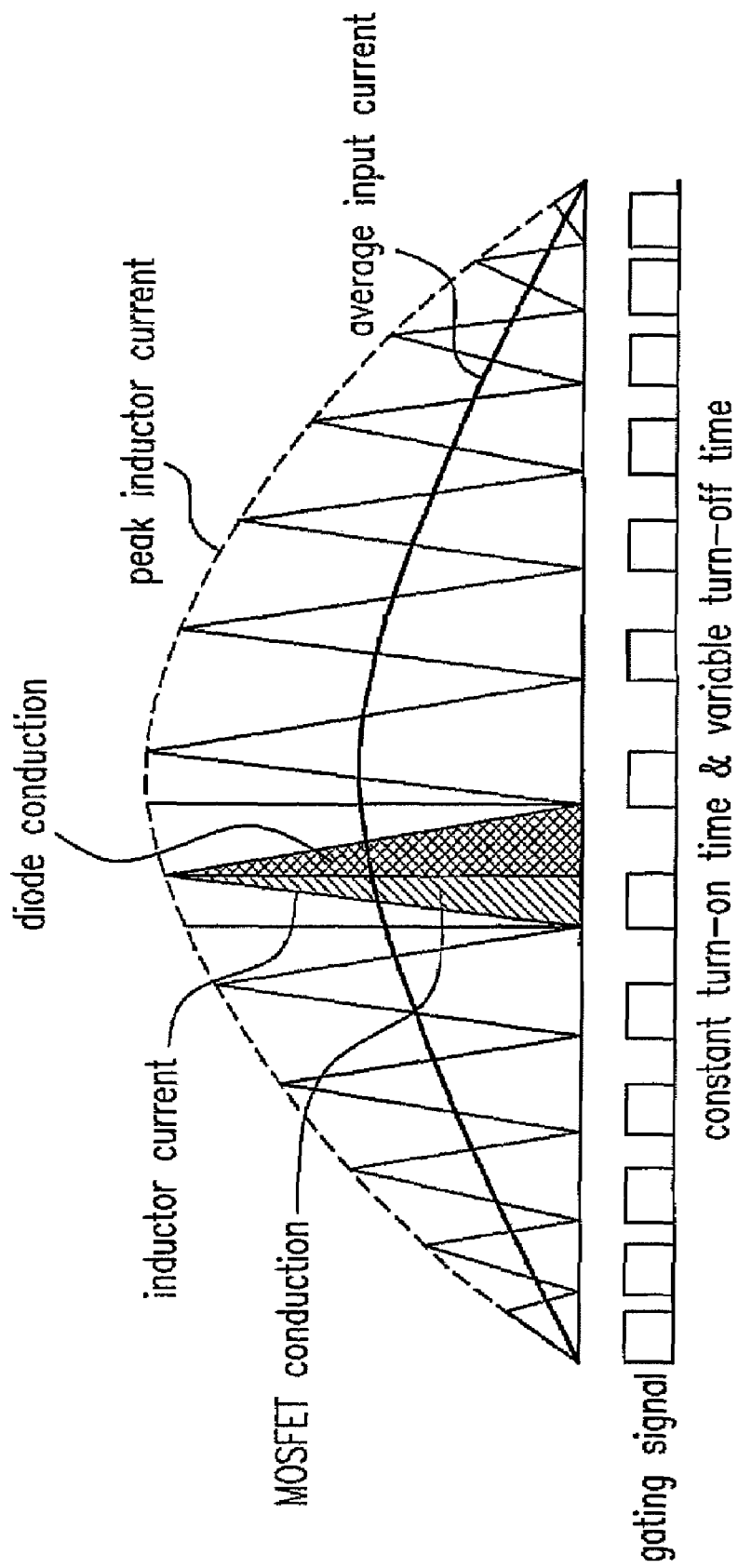
FIG. 2 shows a waveform diagram of the inductor current under the CRM.
Figure 3:
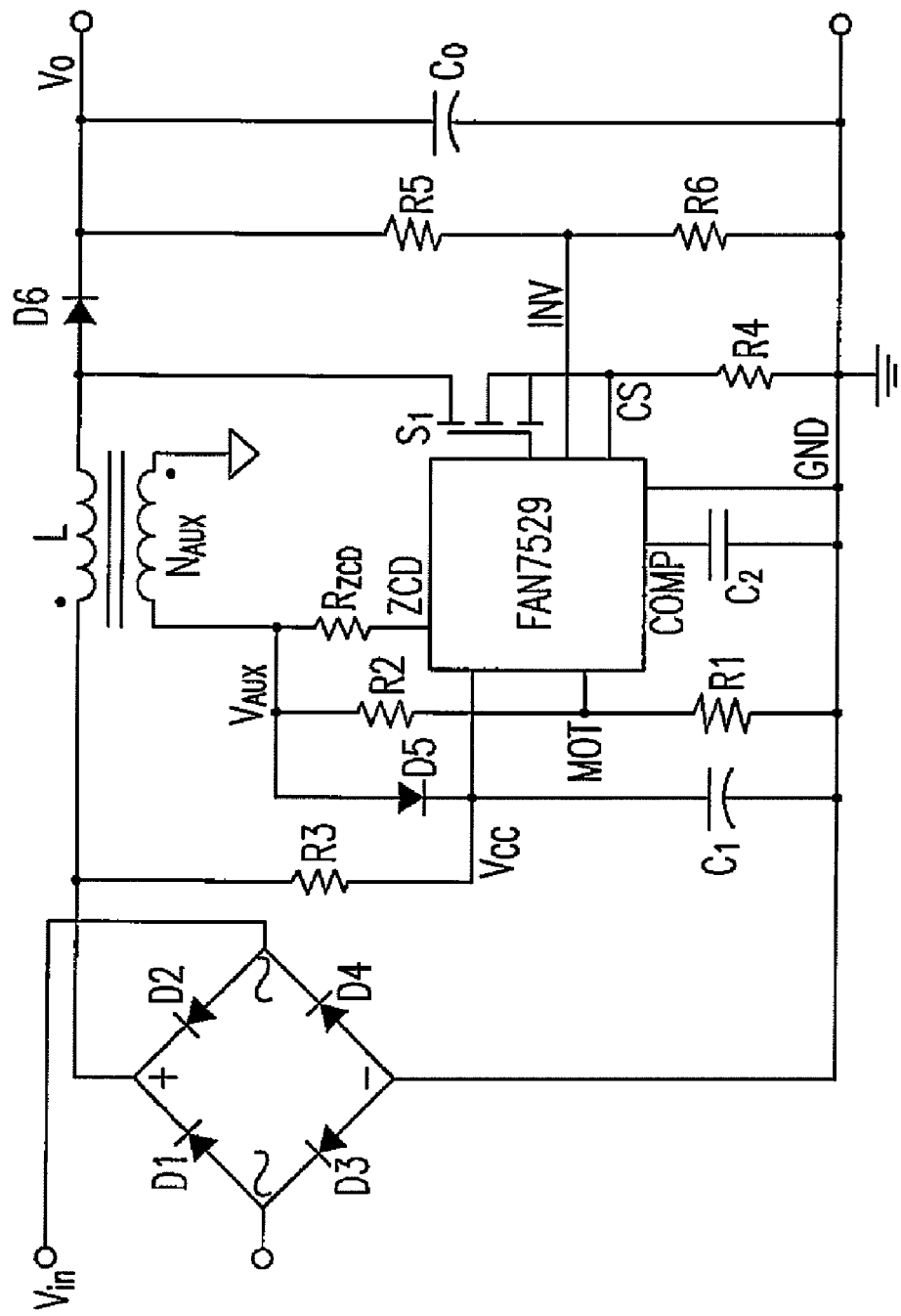
FIG. 3 shows a schematic circuit diagram of a conventional boost PFC circuit realizing the CRM controlling through measuring the voltage of the auxiliary winding of the boost inductor.
Figure 4A:
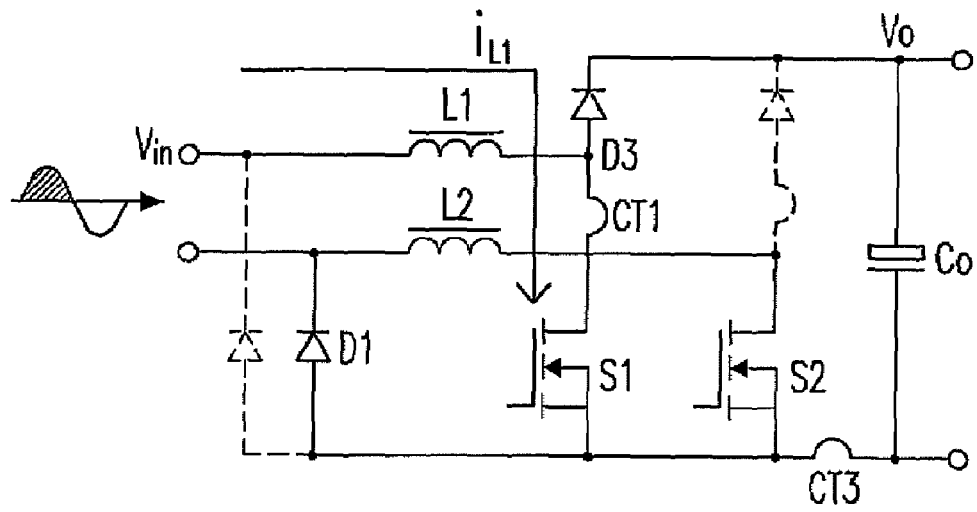
FIGS. 4(a)-4(b) are schematic circuit diagrams showing the statuses of the positive half-cycle and the negative half-cycle of a period of frequency of the conventional dual boost PFC circuit respectively.
Figure 4B:
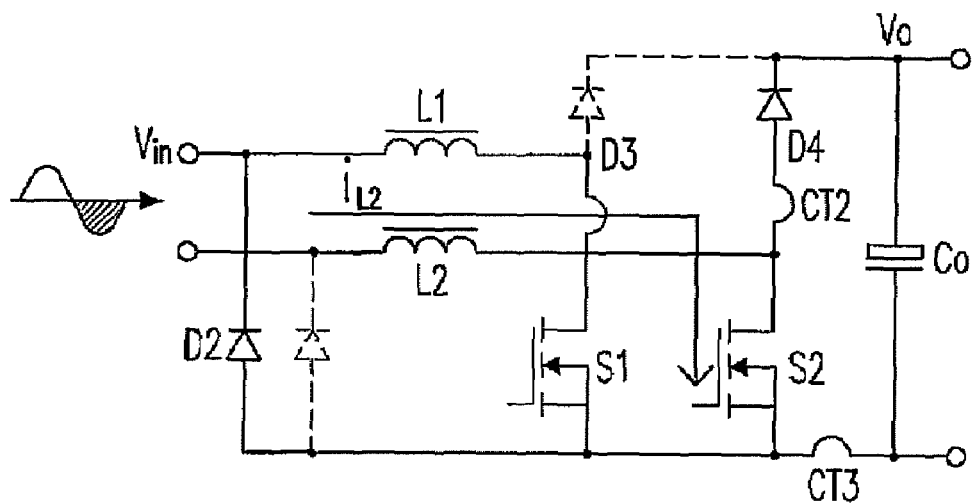

In the dual boost PFC circuit as shown in FIGS. 4(a)-4(b), although at each moment the two inductors are having currents flowing through simultaneously, one inductor voltage is clamped at the conduction voltage drop of the diode D1 or the diode D2 in the circuit when another inductor is implemented as a boost inductor. Due to that this conduction voltage drop is quite small, the voltage amplitude of the auxiliary winding is approximately zero, while the other inductor is under a boost mode. According to this feature, the method for measuring the auxiliary winding voltage of the boost inductor as shown in FIG. 3 could be employed to realize CRM controlling, that is to accumulate the voltages sensed by the two auxiliary windings through two resistors having the same resistance R1 and R2.

Figure 5:
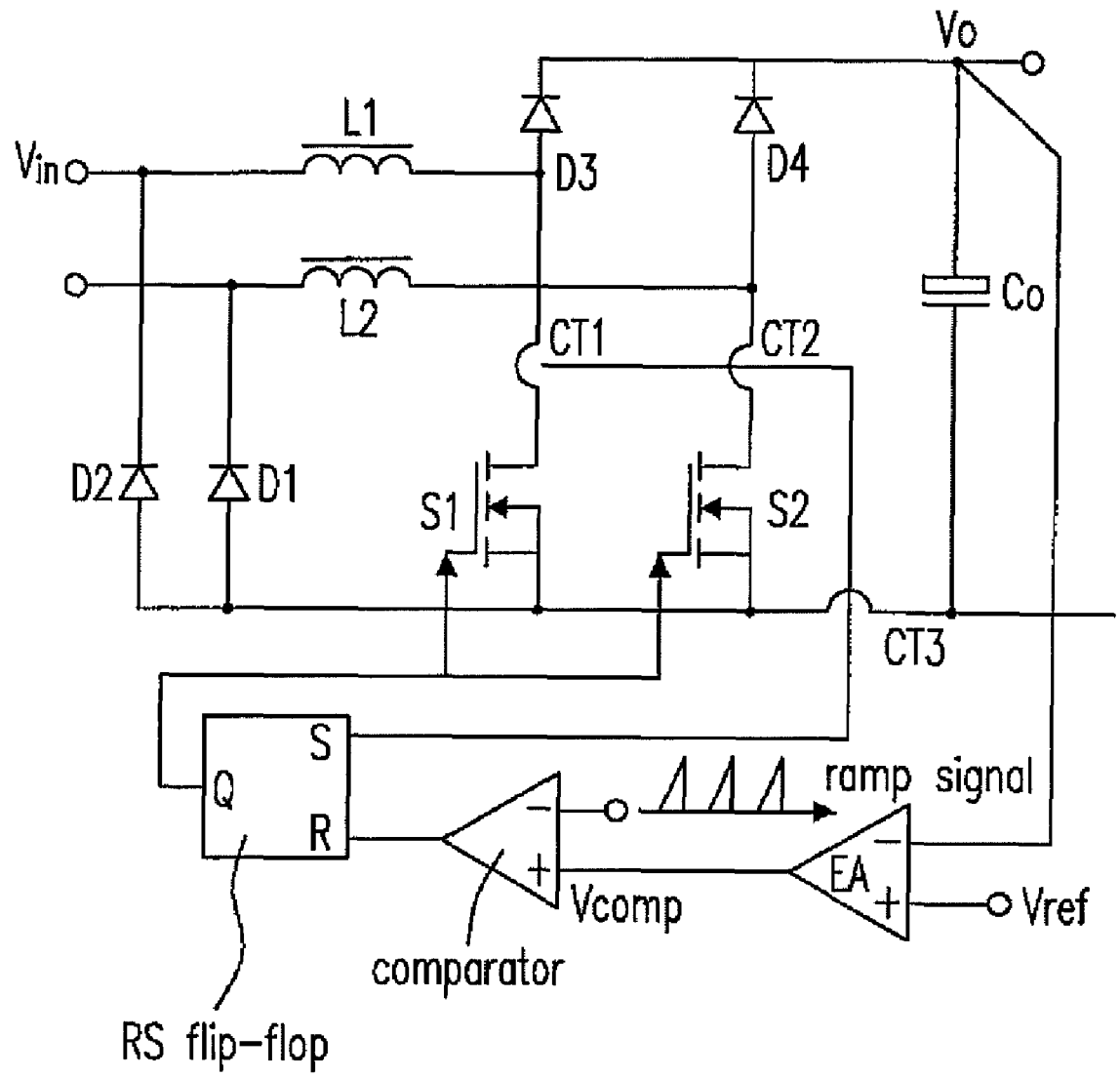
FIG. 5 shows a schematic circuit diagram of a conventional dual boost PFC circuit realizing the CRM controlling via employing a CT.
Figure 6:
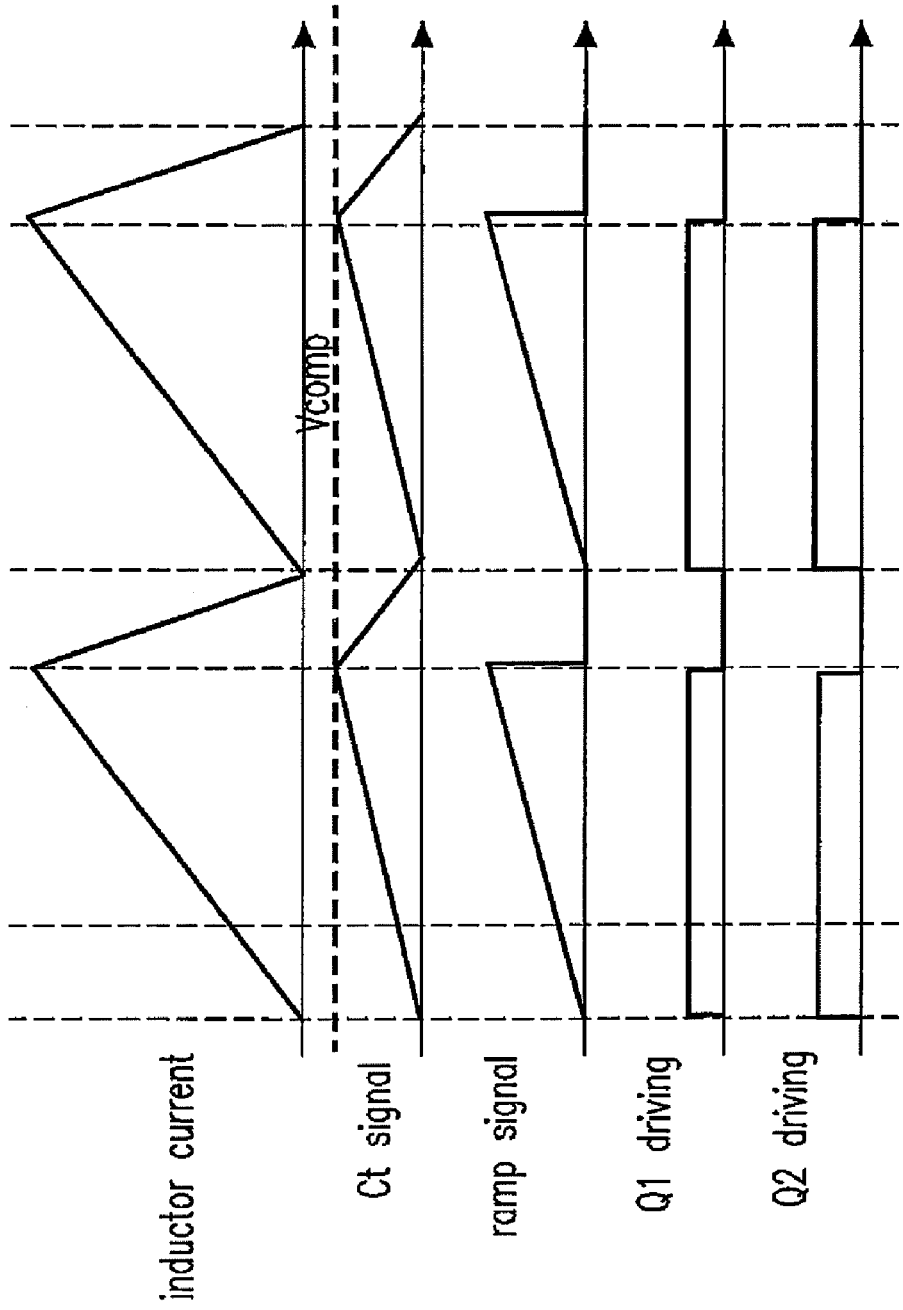
FIG. 6 shows a waveform diagram of the controlling signals of the circuit as shown in FIG. 5.
Figure 8:
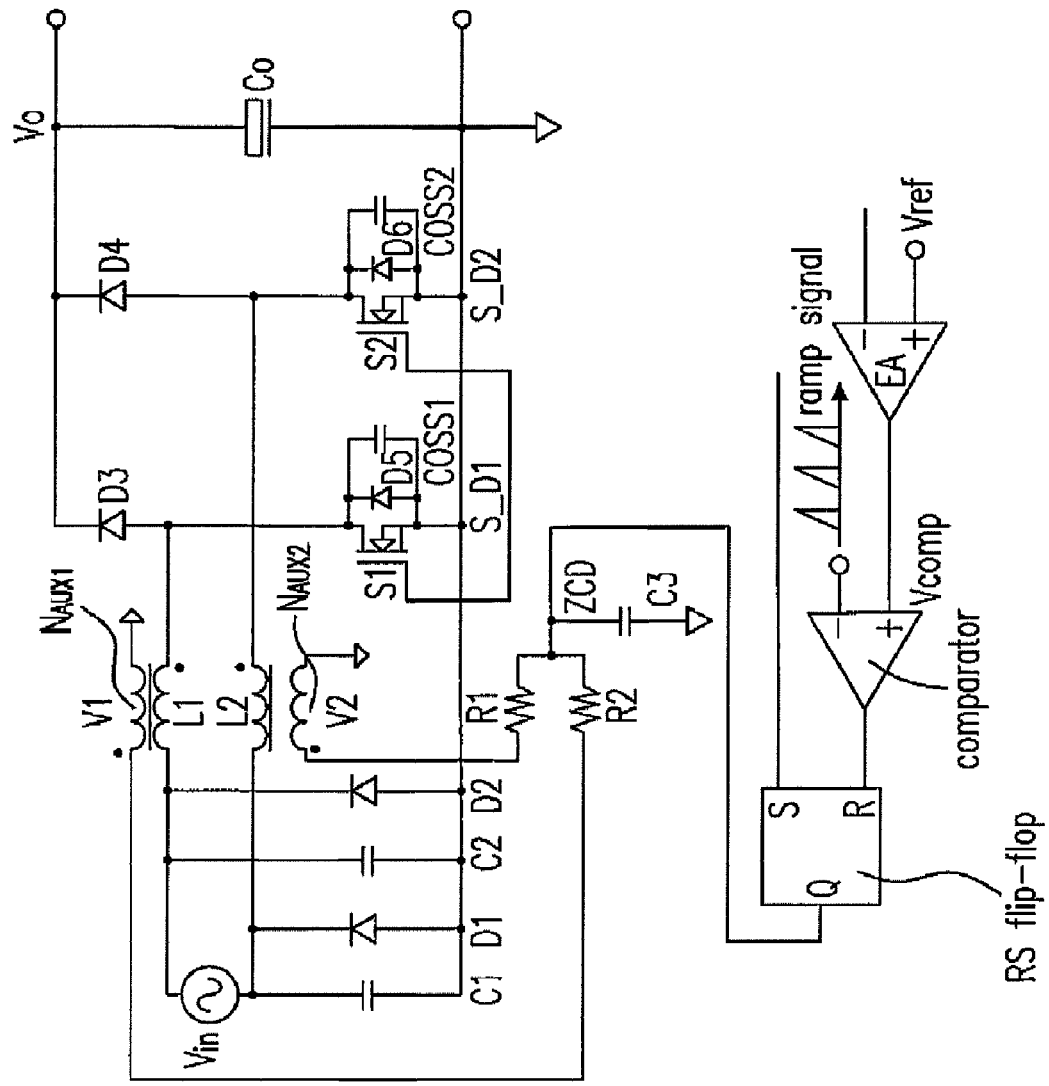
FIG. 8 shows a schematic circuit diagram of a dual boost PFC circuit employing two auxiliary windings to realize the CRM controlling according to the preferred embodiment of the present invention.

As shown in FIG. 8, it is a schematic circuit diagram of a dual boost PFC circuit employing two auxiliary windings to realize the CRM controlling according to the preferred embodiment of the present invention. The voltage V1 sensed by the auxiliary winding of the inductor L1 and the voltage V2 sensed by the auxiliary winding of the inductor L2 are going through the two resistors having the same resistance R1 and R2 respectively so as to be accumulated as a measuring signal of the zero-crossing inductor current and the MOSFET conduction. In the circuit as shown in FIGS. 4(a)-4(b), the measuring signal of the zero-crossing inductor current and the MOSFET conduction is accumulated by the sensed signals of the three CTs CT1-CT3. In the circuit as shown in FIG. 8, the amplitude of the measuring signal accumulated by the voltages of two auxiliary windings of the inductor is higher than the amplitude of the aforementioned one, and the noise margin is higher such that the implementation of the MOSFET is accurate and the switching on loss is decreased. Besides, the measuring signal accumulated by the voltages of two auxiliary windings of the inductor has stable amplitude than that of the above-mentioned one and is irrelevant to the load and ac input voltage. The differences between FIG. 8 and FIG. 5 are that it increases two auxiliary windings NAUX1 and NAUX2, two resistors having the same resistance R1 and R2, and a measuring terminal capacitor C3, and decreases three CTs CT1-CT3.

Figure 9:
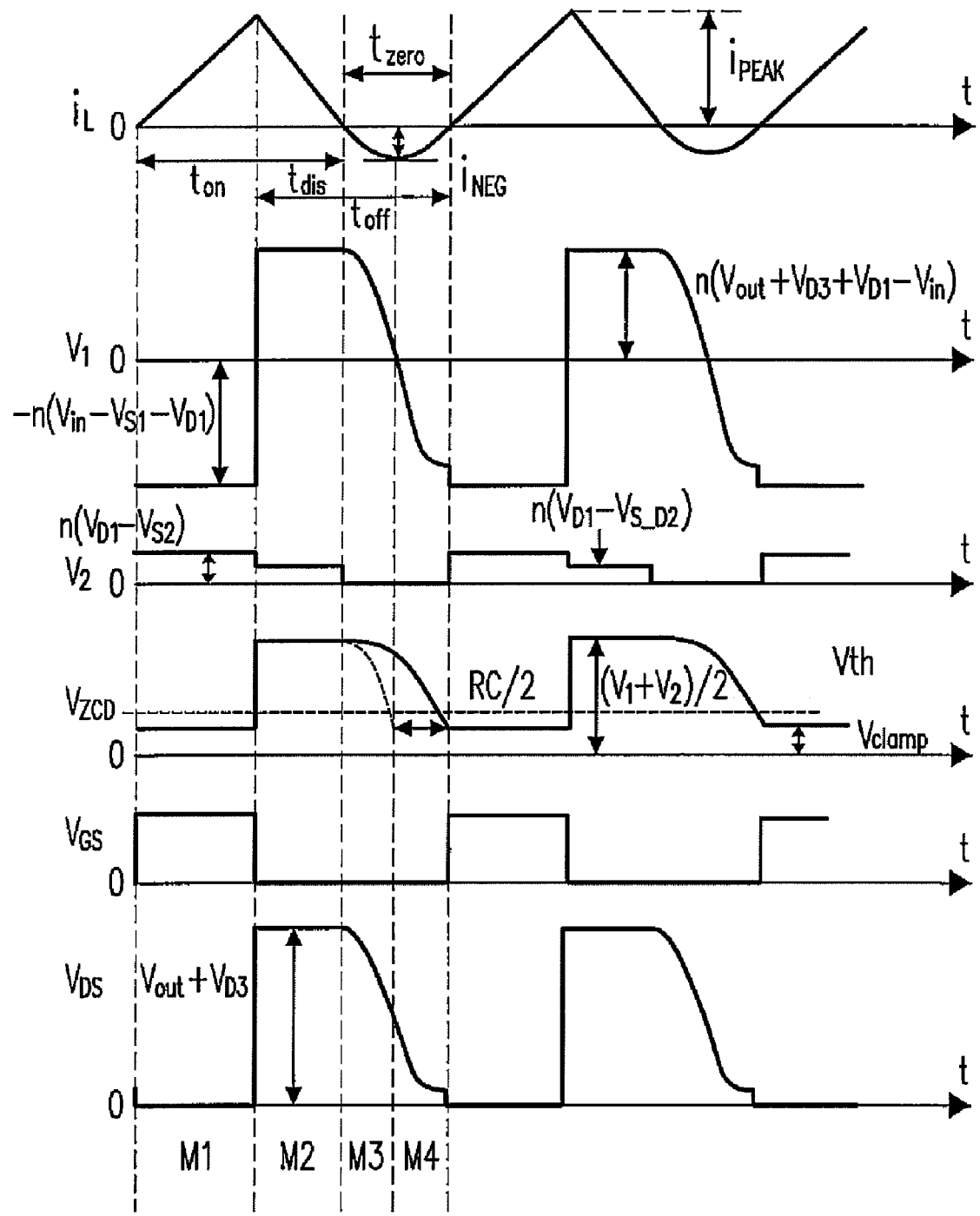
FIG. 9 is a waveform diagram of the circuit as shown in FIG. 8.

FIG. 9 is a waveform diagram of the circuit as shown in FIG. 8. FIGS. 10-13 show the switches' statuses and the currents' flowing directions of four different stages when the input voltage is in the positive half-cycle according to the circuit as shown in FIG. 8. The analyses of the stages of the circuit when the input voltage is in the negative half-cycle are the similar to those of the stages of the circuit when the input voltage is in the positive half-cycle. n is the turns ratio of the auxiliary winding NAUX1 and the inductors L1, the auxiliary winding NAUX2 and the inductors L2.

Figure 10:
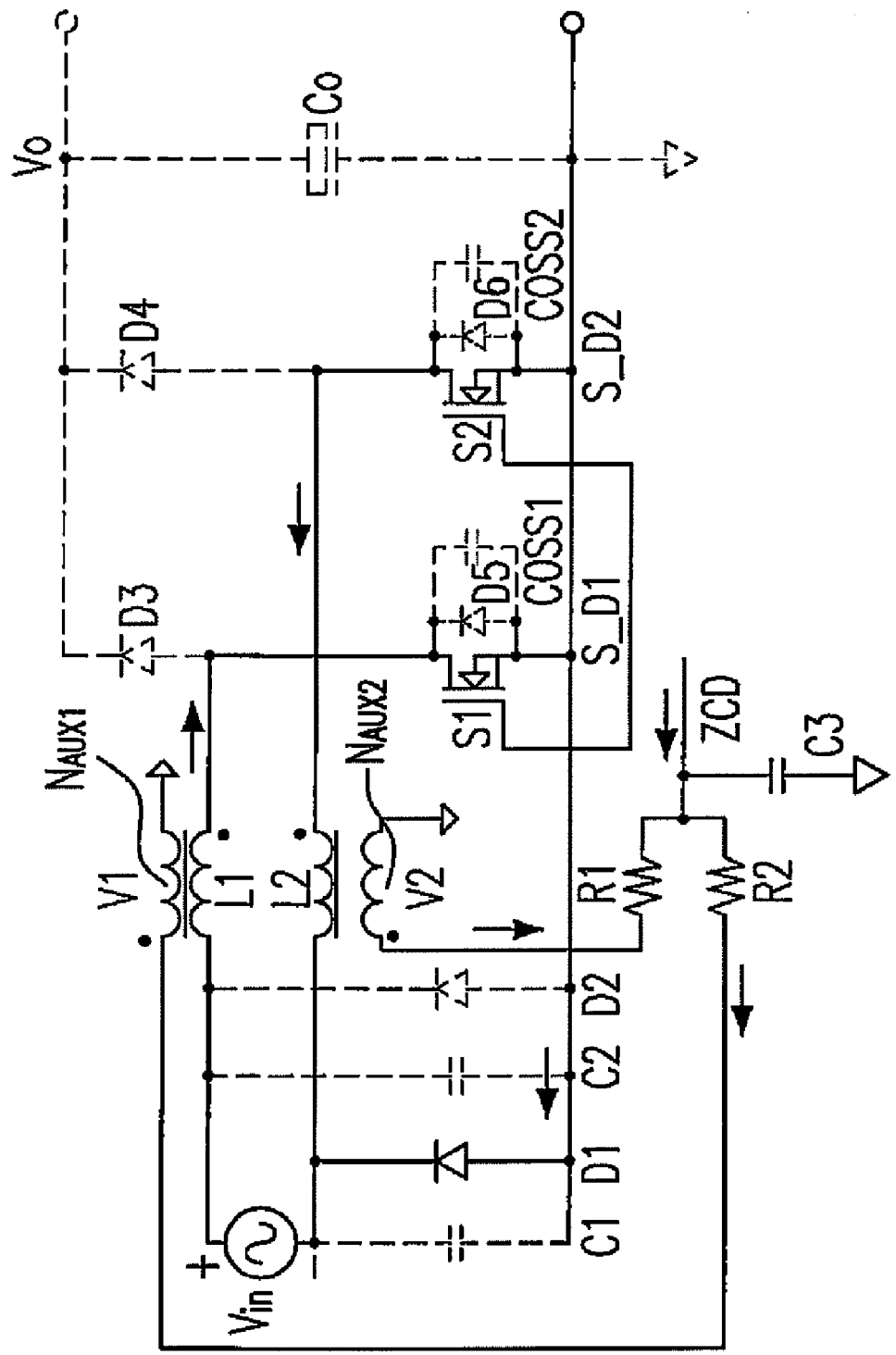
FIGS. 10-13 show the switches' statuses and the currents' flowing directions of four different stages when the input voltage is in the positive half-cycle according to the circuit as shown in FIG. 8.

As shown in FIGS. 9 and 10, at the first stage of the circuit as shown in FIG. 8, two MOSFETs (S1 and S2) are turned on simultaneously, the current flows through L1 and S1, and returns through S2, L2 and D1 respectively. During this period, the inductor current is linearly increased to $i_{PEAK}$. The sensed voltage V1 of the auxiliary winding of the inductor L1 is a negative voltage, the amplitude of which is larger, and is $-n(V_{in}-V_{S1}-V_{D1})$, wherein $V_{S1}$ is the voltage of the switch S1, $V_{D1}$ is the voltage of the diode D1. The sensed voltage V2 of the auxiliary winding of the inductor L2 is a positive voltage, the amplitude of which is quite small, and is $n(V_{D1}-V_{S1})$. These two voltage signals are going through two resistors having the same resistance R1 and R2 respectively and accumulated as the measuring signal of zero-crossing inductor current, the measuring signal has a negative value at this stage, and is clamped by the regulating diode in the IC in general. At the beginning of this stage, the measuring signal triggers the MOSFET driving signal, the MOSFET is turned off after $$t_{M1} = \frac{2P_{OUT}L}{\eta V_{ac}^2},$$

wherein $P_{OUT}$ is the output power value, L is the inductor value, Vac is the input AC voltage value.

Figure 11:
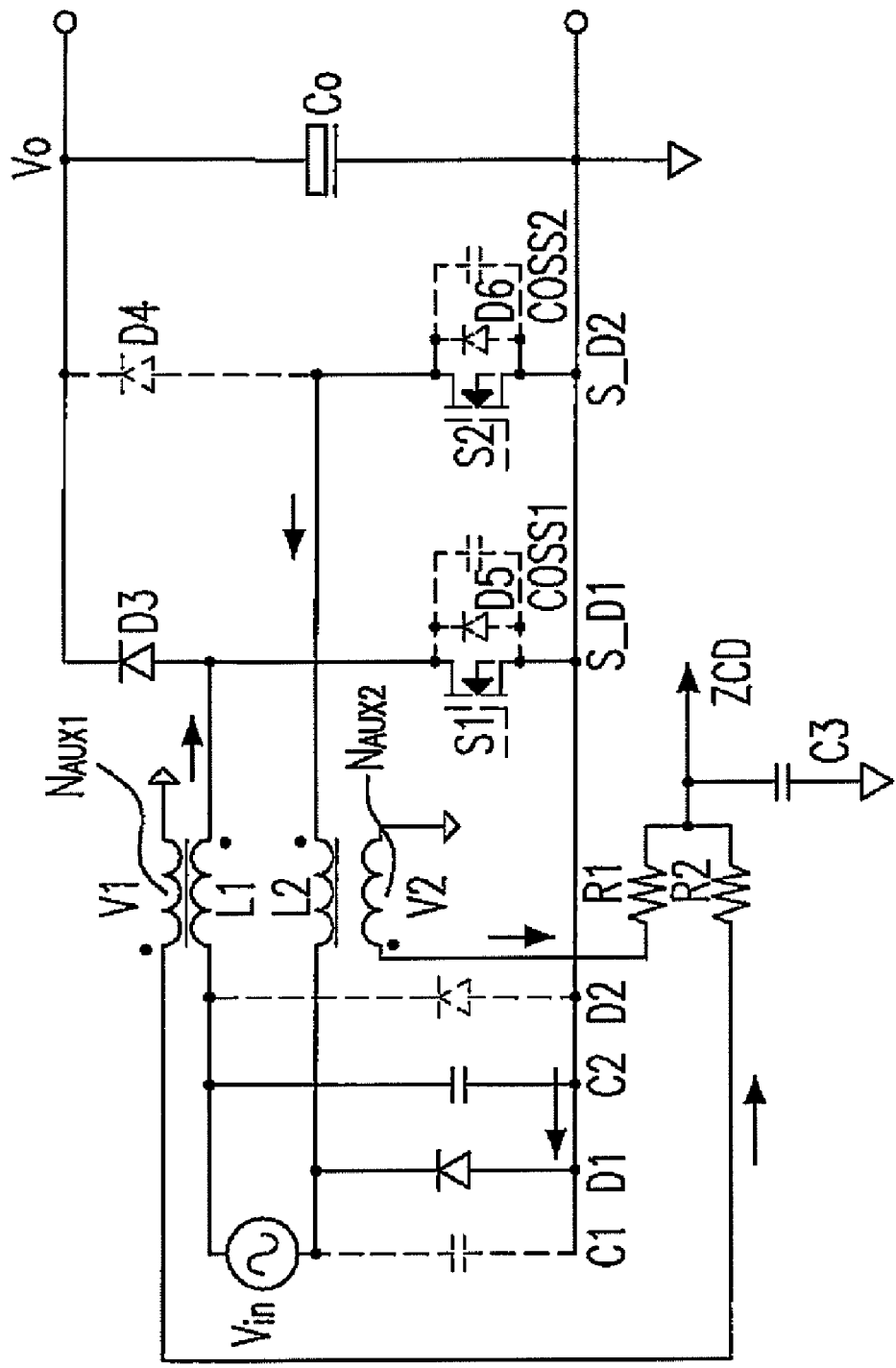

As shown in FIGS. 9 and 11, at the second stage of the circuit, two MOSFETs (S1 and S2) are turned off simultaneously, the current flows through L1, D3 and C1, and returns through S_D2, L2 and D1 respectively. During this period, the inductor current is $(V_{out}+V_{D3}+V_{D1}-V_{in})$, wherein $V_{OUT}$ is the output voltage $V_o$, $V_{D3}$ is the voltage of the diode D3, the inductor current is linearly decreased to zero. The sensed voltage V1 of the auxiliary winding of the inductor L1 is a positive voltage, the amplitude of which is larger, and is $n(V_{out}+V_{D3}+V_{D1}-V_{in})$. The sensed voltage V2 of the auxiliary winding of the inductor L2 is a positive voltage, the amplitude of which is quite small, and is $n(V_{D1}-V_{S\_D2})$, wherein $V_{S\_D2}$ is the voltage at the node S_D2. These two voltage signals are going through two resistors having the same resistance R1 and R2 respectively and accumulated, the measuring signal has a positive value at this stage, and is far larger than the measuring threshold value required by conducting the MOSFET. At this stage, $$t_{M2} = \frac{i_{PEAK}}{V_{out}+V_{D3}+V_{D1}-V_{in}}L,$$

wherein $i_{PEAK}$ is the peak value of the inductor current.

Figure 12:
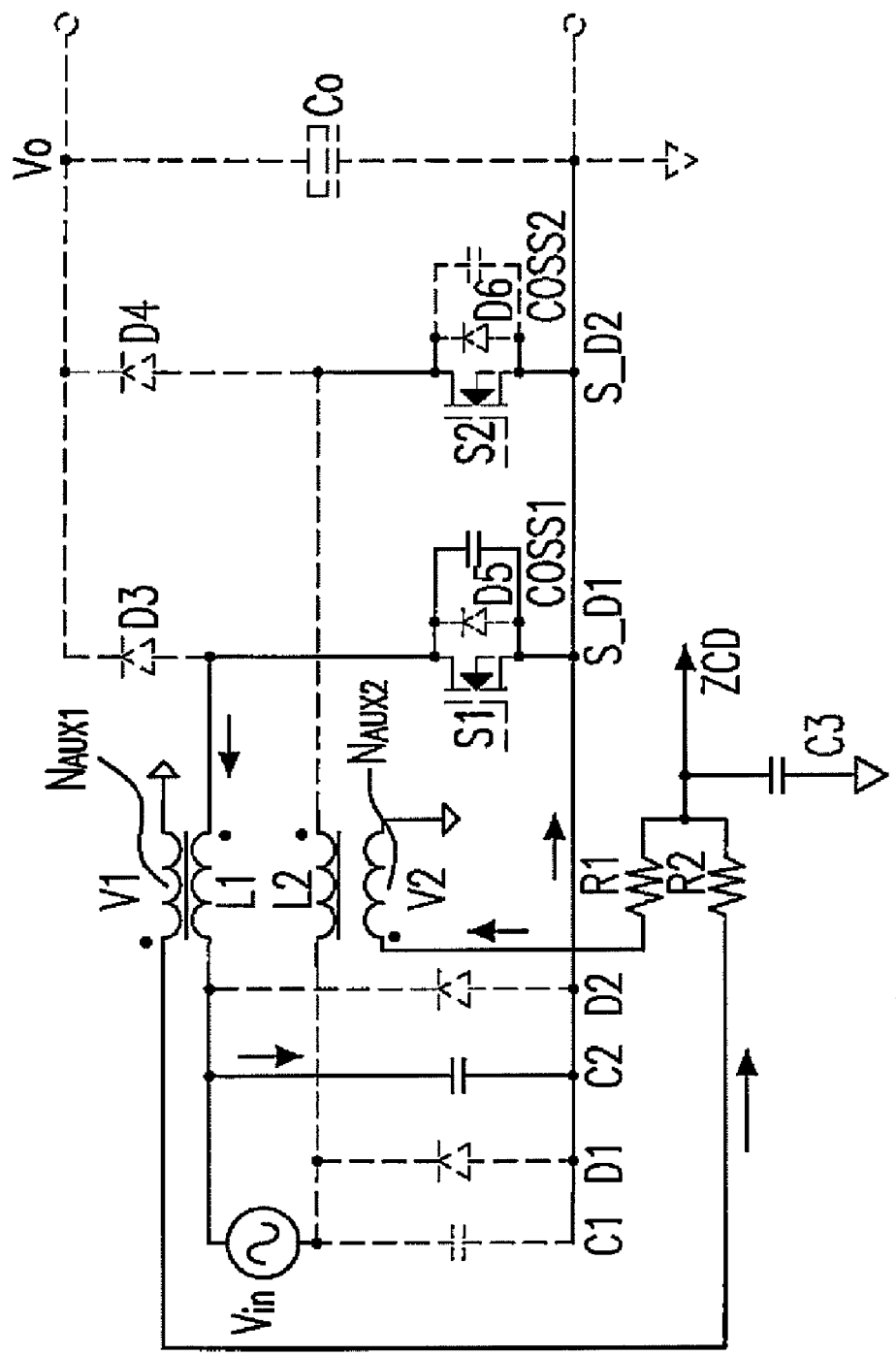

As shown in FIGS. 9 and 12, at the third stage of the circuit, the diode D3 is turned off after the diode current reaches zero and does not generate the reverse recovery current. The parasitic capacitance COSS1 of the switch S1 discharges and is resonant with the inductor L1 through the capacitor C2. There is no current flowing through the inductor L2, and the sensed voltage V2 of the auxiliary winding $N_{AUX2}$ of the inductor L2 is zero. The sensed voltage V1 of the auxiliary winding $N_{AUX1}$ of the inductor L1 is resonantly decreased, and the amplitude of which is zero at the end of that stage. These two voltage signals are going through two resistors having the same resistance R1 and R2 respectively and accumulated. Due to the existing of the measuring terminal capacitor C3, the measuring terminal voltage is still larger than the measuring threshold value required by conducting the MOSFET. At this stage, $$t_{M3} = \frac{\pi}{2}\sqrt{LC_{OSS}},$$

wherein L is the inductor value, and $C_{OSS}$ is the parasitic capacitance value.

Figure 13:
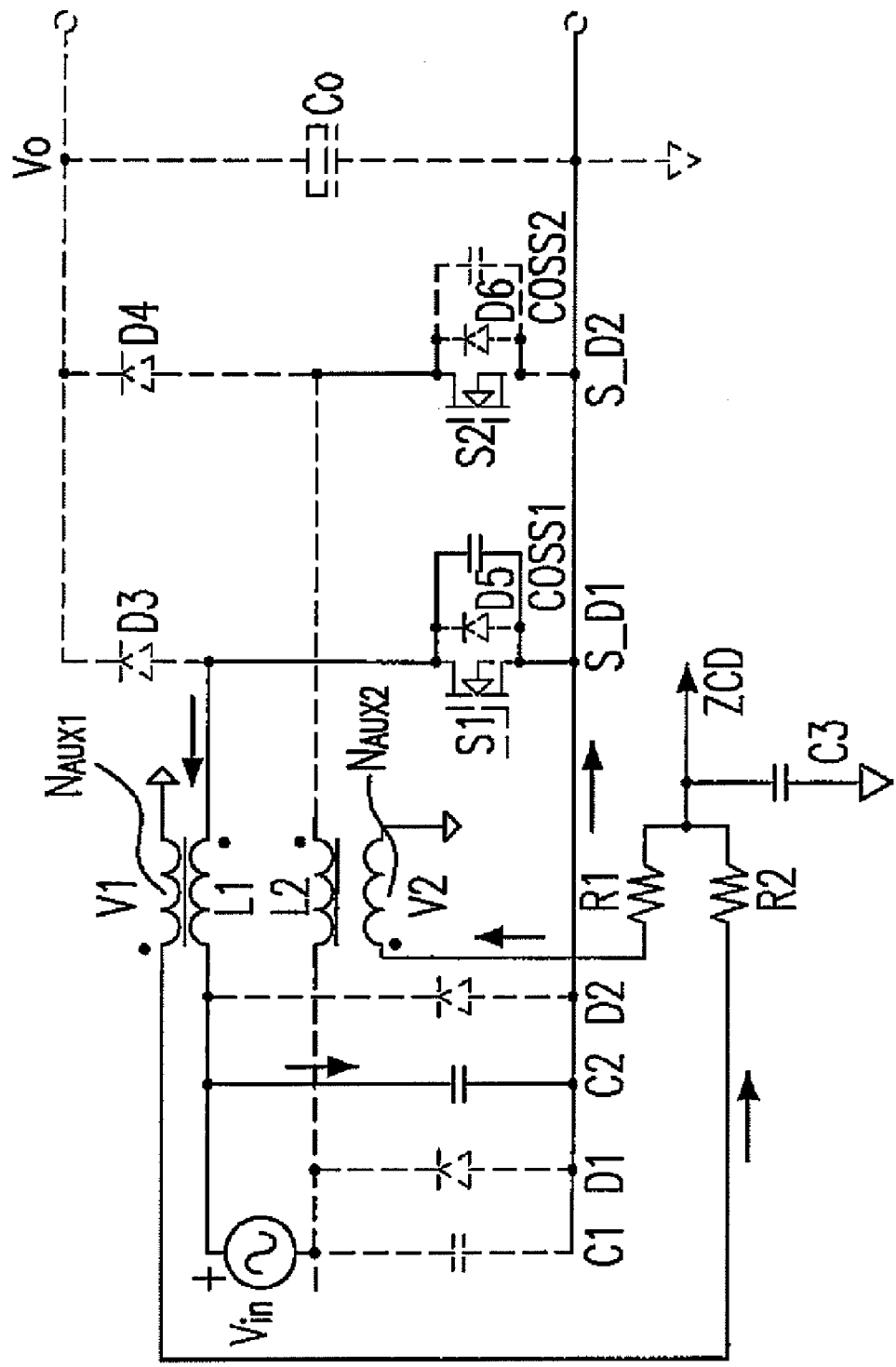

As shown in FIGS. 9 and 13, at the fourth stage of the circuit, the parasitic capacitance COSS1 of the switch S1 is resonant with the inductor L1 through the capacitor C2 continuously, and the current path is the same as the previous stage. The sensed voltage V2 of the auxiliary winding $N_{AUX2}$ of the inductor L2 is zero. The sensed voltage V1 of the auxiliary winding $N_{AUX1}$ of the inductor L1 is resonant and decreased to a negative value. At the end of the stage, the amplitude of which is close to $-n(V_{in}-V_{S1}-V_{D1})$, and corresponds to VDS1 (the drain to source voltage of S1) closing to zero. These two voltage signals are accumulated, and go through a delay time of RC/2 (wherein R is the resistance value R of the resistors R1 and R2, and C is the capacitance value of the capacitor C3), the voltage value is lower than the measuring threshold value required by conducting the MOSFET, the MOSFET is turned on, and the four stages of the positive half-cycle are ended. At this stage, $$t_{M4} = \frac{\pi}{2}\sqrt{LC_{OSS}} = RC/2.$$

Figure 7:
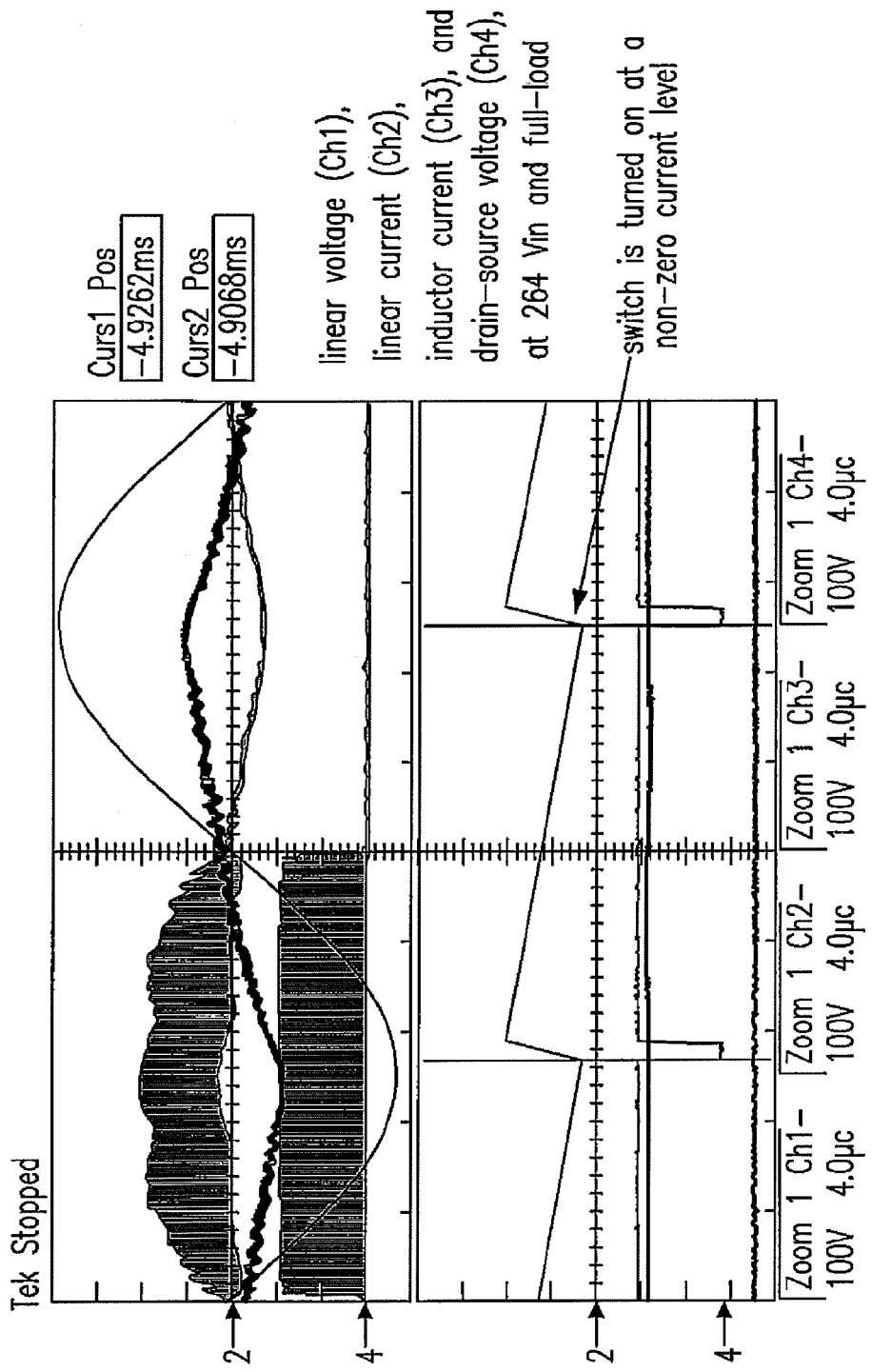
FIG. 7 is a waveform diagram showing a failure of measuring the zero-crossing inductor current under high input voltage and full-load condition (264Vin and 310 W load) of the circuit as shown in FIG. 5.
Figure 14:
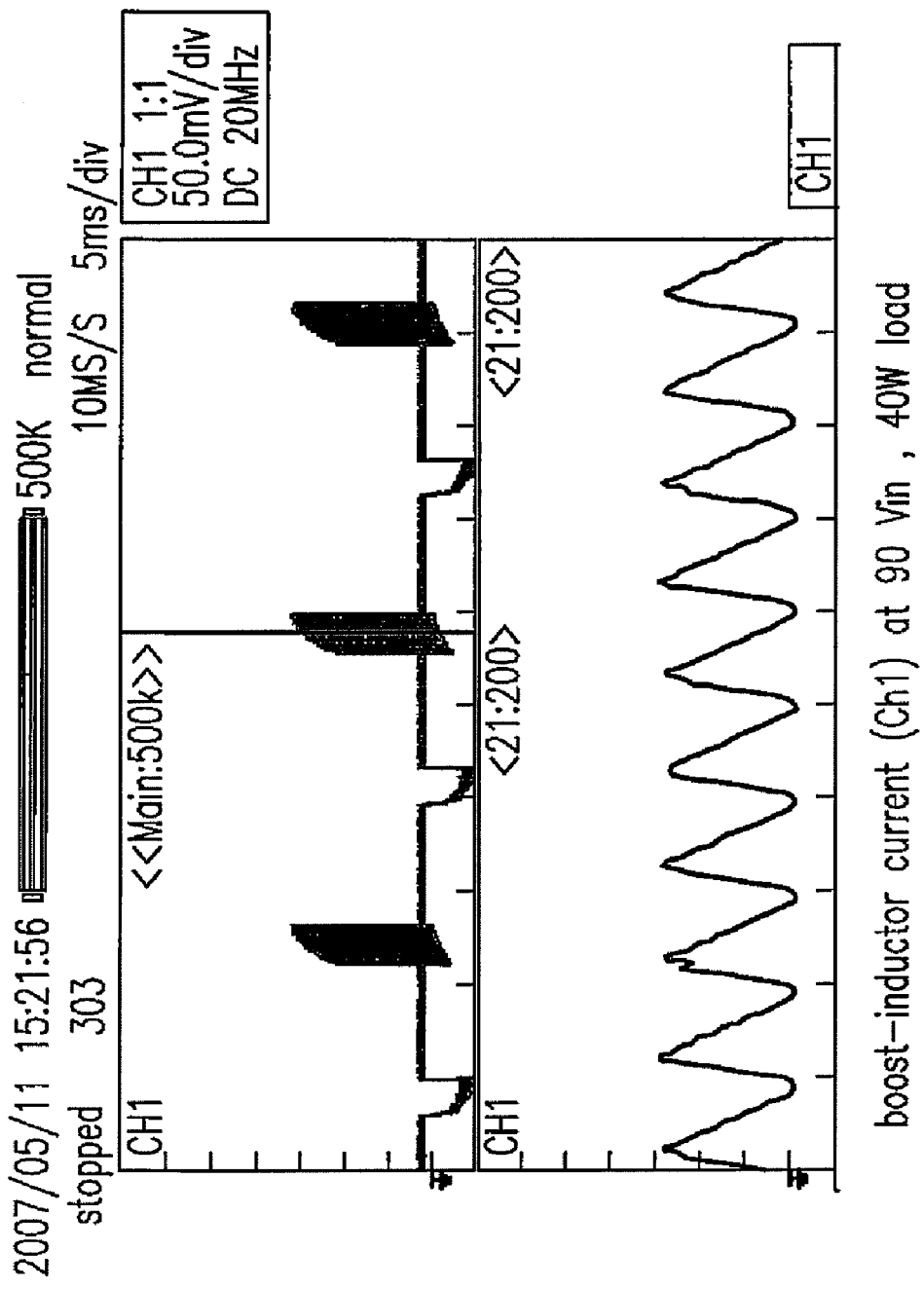
FIG. 14 is a waveform diagram showing the waveforms for the zero-crossing inductor current measurement of the circuit as shown in FIG. 8 under the light load (90Vin and 40 W load).

FIG. 14 is a waveform diagram showing the waveforms for the zero-crossing inductor current measurement of the circuit as shown in FIG. 8 under the light load (90Vin and 40 W load). In which, there is no occasion of "the switch is turned on when the current is not zero yet" as shown in FIG. 7 of the prior art, and the present invention can truly be used to decrease the relevant losses of the bridgeless PFC circuit.

According to the aforementioned descriptions, the present invention provides a method for measuring a combined voltage of two inductor auxiliary windings to realize the measurement of the zero-crossing current of the inductor so as to control the DBPFC to work under the CRM. The controlling method does not need to measure the inductor current, does not need to measure the AC input voltage, could obtain the measuring signal of the zero-crossing current of the inductor current irrelevant to the AC input voltage and the output load, and which possesses the advantages of the MOSFET implementations are accurate, the turn-on losses are decreased, and the efficiency is improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A bridgeless power factor correction (PFC) circuit system, comprising:
   a bridgeless PFC circuit having:
      a first and a second input terminals;
      a first and a second output terminals;
      a first switch having a first terminal and a second terminal coupled to the second output terminal;
      a first inductor having a first terminal coupled to the first input terminal and a second terminal coupled to the first terminal of the first switch; and
      a second inductor having a first terminal coupled to the second input terminal; and
   a sensing circuit, comprising:
      a first auxiliary winding magnetically coupled to the first inductor and generating a first sensing signal;
      a second auxiliary winding magnetically coupled to the second inductor and generating a second sensing signal,
   wherein the first and the second sensing signals are used to generate an inductor current sensing signal and the first switch is turned on when a value of the inductor current sensing signal is a predetermined value.

2. A system according to claim 1, wherein the bridgeless PFC circuit further comprises a first diode having an anode coupled to the second terminal of the first switch and a cathode coupled to the first terminal of the second inductor, and a second diode having an anode coupled to the second terminal of the first switch and a cathode coupled to the first terminal of the first inductor.

3. A system according to claim 1, wherein the sensing circuit is an inductor current sensing circuit, the first and the second auxiliary windings respectively have two first terminals generating the first and the second sensing signals respectively and two second terminals, each the second terminal has one of a function of receiving a predetermined voltage value and a function of grounding, a first polarity of the first auxiliary winding is reverse to a first polarity of the first inductor, a first polarity of the second auxiliary winding is reverse to a first polarity of the second inductor, and the inductor current sensing circuit further comprises:
   a first resistor having a first terminal coupled to the first terminal of the second auxiliary winding and a second terminal;
   a second resistor having a first terminal coupled to the first terminal of the first auxiliary winding and a second terminal coupled to the second terminal of the first resistor; and
   a capacitor having a first terminal coupled to the second terminal of the second resistor and outputting the inductor current sensing signal, and a second terminal grounded.

4. A system according to claim 3, wherein the bridgeless PFC circuit is a dual boost PFC circuit, the dual boost PFC circuit further comprises a second switch, the second switch is turned on when a value of the inductor current sensing signal is a predetermined value, and the first and the second resistors have the same resistance.

5. A system according to claim 1, wherein the second inductor further comprises a second terminal, the bridgeless PFC circuit is a dual boost PFC circuit comprising a second switch having a first and a second terminals and a third and a fourth diodes, each of the third and the fourth diodes has an anode and a cathode, the anode of the third diode is coupled to the second terminal of the first inductor, the cathode of the third diode is coupled to the first output terminal, the anode of the fourth diode is coupled to the second terminal of the second inductor and the first terminal of the second switch, the cathode of the fourth diode is coupled to the first output terminal, and the second terminals of the first and the second switches are coupled to the second output terminal.

6. A system according to claim 5 further comprising a control circuit, wherein and the control circuit comprises:
   an error amplifier receiving a reference voltage and an output voltage feedback signal generated by the dual boost PFC circuit, and generating a first output signal;
   a comparator receiving the first output signal and an external ramp signal, and generating a second output signal; and
   a flip-flop having a first input terminal receiving the inductor current sensing signal, a second input terminal receiving the second output signal and an output terminal generating a driving signal driving the first and the second switches.

7. A system according to claim 6, wherein the flip-flop is an RS flip-flop.

8. A bridgeless power factor correction (PFC) circuit system, comprising:
   a bridgeless PFC circuit having:
      a first and a second input terminals;
      a first switch having a first terminal;
      a first inductor having a first terminal coupled to the first input terminal and a second terminal coupled to the first terminal of the first switch; and
      a second inductor having a first terminal coupled to the second input terminal;
   a first auxiliary winding coupled to the first inductor and generating a first sensing signal; and
   a second auxiliary winding coupled to the second inductor and generating a second sensing signal,
   wherein the first and the second sensing signals are used to generate an inductor current sensing signal and the first switch is turned on when a value of the inductor current sensing signal is a predetermined value.

9. A system according to claim 8, wherein the first switch further comprises a second terminal, the bridgeless PFC circuit further comprises a first diode having an anode coupled to the second terminal of the first switch and a cathode coupled to the first terminal of the second inductor, and a second diode having an anode coupled to the second terminal of the first switch and a cathode coupled to the first terminal of the first inductor, the first auxiliary winding has a first polarity reversed to a first polarity of the first inductor, the second auxiliary winding has a first polarity reversed to a first polarity of the second inductor, the first and the second auxiliary windings respectively have two first terminals outputting the first and the second sensing signals respectively and two second terminals, each the second terminal has one of a function of receiving a predetermined voltage value and a function of grounding, and the system further comprises a first resistor having a first terminal coupled to the first terminal of the second auxiliary winding and a second terminal;

a second resistor having a first terminal coupled to the first terminal of the first auxiliary winding and a second terminal coupled to the second terminal of the first resistor; and a capacitor having a first terminal coupled to the second terminal of the second resistor and outputting the inductor current sensing signal, and a second terminal grounded.

10. A system according to claim 9, wherein the first and the second resistors have the same resistance.

11. A system according to claim 9 further comprising a control circuit, wherein the second inductor further comprises a second terminal, the bridgeless PFC circuit is a dual boost PFC circuit comprising a first and a second output terminals, a second switch having a first and a second terminals, and a third and a fourth diodes, each of the third and the fourth diodes has an anode and a cathode, the anode of the third diode is coupled to the second terminal of the first inductor, the cathode of the third diode is coupled to the first output terminal, the anode of the fourth diode is coupled to the second terminal of the second inductor and the first terminal of the second switch, the cathode of the fourth diode is coupled to the first output terminal, the second terminals of the first and the second switches are coupled to the second output terminal, and the control circuit comprises:

an error amplifier receiving a reference voltage and an output voltage feedback signal generated by the dual boost PFC circuit, and generating a first output signal;

a comparator receiving the first output signal and an external ramp signal, and generating a second output signal; and a flip-flop having a first input terminal receiving the inductor current sensing signal, a second input terminal receiving the second output signal and an output terminal generating a driving signal to drive the first and the second switches.

12. A controlling method for a bridgeless power factor correction (PFC) circuit system, wherein the system comprises a bridgeless PFC circuit having a first switch, a first and a second inductors, a first auxiliary winding coupled to the first inductor and a second auxiliary winding coupled to the second inductor, comprising steps of:

causing the first auxiliary winding to generate a first sensing signal;

causing the second auxiliary winding to generate a second sensing signal;

using the first sensing signal and the second sensing signal to generate an inductor current sensing signal; and turning on the first switch when a value of the inductor current sensing signal is a predetermined value.

13. A method according to claim 12, wherein the first auxiliary winding has a first polarity reversed to a first polarity of the first inductor, and the second auxiliary winding has a first polarity reversed to a first polarity of the second inductor.

14. A method according to claim 12 further comprising a step of: turning on a second switch when a value of the inductor current sensing signal is a predetermined value.

15. A method according to claim 12 further comprising a step of: generating a driving signal to drive the first switch and a second switch.

16. A bridgeless power factor correction (PFC) circuit system, comprising:

a bridgeless PFC circuit having:

a first and a second output terminals;

a first and a second power input terminals;

a first and a second inductors;

two switch bridges;

an output capacitor, wherein the two switch bridges and the output capacitor are connected between the first and the second output terminals, each the switch bridge comprises two series connected switches having a middle point, one of the two series connected switches is a controllable switch connected to the second output terminal, and each the middle point connected to the respective first and second power input terminals via the first and the second inductors;

two clamping switches connected to the second output terminal and the first and the second power input terminals;

a first auxiliary winding coupled to the first inductor and generating a first sensing signal; and a second auxiliary winding coupled to the second inductor and generating a second sensing signal; and a signal processing circuit processing the first and the second sensing signals and generating a control signal to control each the controllable switch.

17. A system according to claim 16, wherein the two clamping switches are two diodes.

18. A system according to claim 16, wherein the control signal is a zero-crossing current signal generated via accumulating the first and the second sensing signals to control each the controllable switch accordingly.

* * * * *